United States Patent [19]

Hayami

[11] Patent Number: 4,970,112

[45] Date of Patent: Nov. 13, 1990

[54] SHIELDED WIRE

[75] Inventor: Hiroshi Hayami, Osaka, Japan

[73] Assignee: Sumitomo Electric Industries, Ltd., Osaka, Japan

[21] Appl. No.: 334,863

[22] Filed: Apr. 6, 1989

[30] Foreign Application Priority Data

Apr. 13, 1988 [JP] Japan .................................. 63-49516

[51] Int. Cl.⁵ ........................... H01B 7/00; B32B 3/26

[52] U.S. Cl. ............................... 428/314.4; 174/110 f; 174/110 PM; 427/119; 428/314.8; 428/316.6; 428/319.1

[58] Field of Search .................... 174/110 F, 110 PM; 427/119; 428/314.4, 314.8, 316.6, 319.1

[56] References Cited

U.S. PATENT DOCUMENTS 4,352,701 10/1982 Shimba et al. .................. 174/110 F 4,683,166 7/1987 Yuto et al. ...................... 428/319.1

*Primary Examiner*—William J. Van Balen

*Attorney, Agent, or Firm*—Wenderoth, Lind & Ponack

[57] ABSTRACT

The present invention relates to a very small diameter shielded wire having low electric capacitance and high dielectric breakdown voltage.

A shielded wire with polyethylene foam insulation has been widely used as interconnecting wires or cables between an antenna and a tuner of TV set, video equipments, computer equipments.

However, the shielded wire with polyethylene foam insulation has shown a problem of lowering the dielectric breakdown voltage when the wall-thickness of the polyethylene foam insulating layer is less than 300 microns.

The present invention has been achieved in order to solve the above described problem. That is to say, it has been found that the lowering of dielectric breakdown voltage can be remarkably reduced when the maximum diameter of bubbles within the polyethylene foam insulating layer are controlled less than a half times of the wall-thickness of the insulating layer, even though the wall-thickness of the insulating layer is less than 100 microns.

1 Claim, 1 Drawing Sheet

SHIELDED WIRE

DETAILED DESCRIPTION OF THE INVENTION

Field of the Invention

Figure 1:
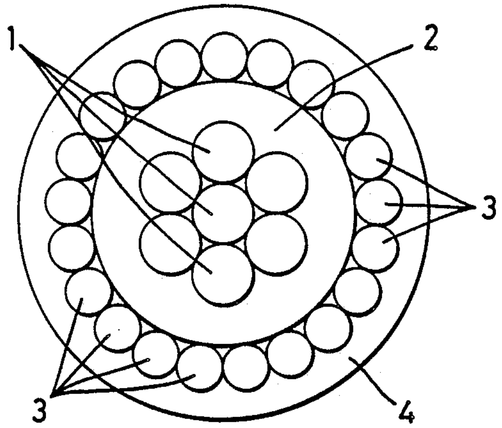

The present invention relates to a very small diameter shielded wire having low electric capcitance and high dielectric breakdown voltage.

A shielded wire with polyethylene foam insulation of an internal conductor has been widely use as interconnecting wires or cables between an antenna and a tuner of TV set, video equipments, computer equipments.

In above mentioned uses the frequency of the transmitting signal is generally more than 1 MHz and also the voltage of the signal is very low.

Accordingly, the shielded structure is favourable for avoiding the influence of circumferential electromagnetic noises however, the shielded structure has a problem that the intensity of the transmitting signal is attenuated on account of the electric capacitance between the internal conductor and the external conductor with increase of the transmititng length.

In order to solve this problem, dielectric constant of the insulator between internal conductor and external conductor should be reduced.

Today various methods of reducing the dielectric constant of the insulator are known.

For example, dielectric constant of polyethylene form can be optionally controlled by changing the porosity (the total volume of bubbles existing within a material/the volume of the material as a whole) nand thus polyethylene foam insulation has been widely used practically.

For instance, a virgin polyethylene has the dielectric constant of about 2.2 to 2.3 however, it can be easily reduced until about 1.3 to 1.5 by setting the porosity at 50%.

But recently, particularly in the uses for signal transmission between computer equipments, there are many cases that more than 100 different pieces of signal must be transmitted simultaneously.

Accordingly in such cases, more than 100 pieces of shielded wires are necessary owing to the limitation of electric multiplication of signal.

In fact, the shield cables (many shielded wires gathered structure) are applied for such cases, and small diameter shielded cable is practically favorable regarding to the facility of handling.

However, conventional shielded wires of polyethylene foam insulation have the wall-thickness of more than 300 microns in general, and the shielded wire with less than 300 microns thick polyethylene foam insulation has never been known.

Therefore in general cases, provided that the diameter of the internal conductor is 200 microns, the diameter of the polyethylene foam insulation already amounts to more than 800 microns (0.800 mm). Accordingly the total diameter of conventional shielded wire amounts to more than 1.0 mm when the external conductor and the outer insulating sheath are assembled in general manner.

In above case, even if the diameter of the internal conductor is set at 100 microns, the diameter of polyethylene foam insulation amounts to more than 700 microns.

However, if the wall-thickness of polyethylene foam insulation is set at 150 microns (i.e.; a half times of conventional wall-thickness), the diameter of polyethylene foam insulation can be reduced to 500 microns even though the diameter of the internal conductor is 200 microns.

Additionally it is not to say that the diameter of polyethylene foam insulation can be reduced to 400 microns in case of the wall-thickness of polyethylene foam insulation is 100 microns even though the diameter of the internal conductor is 200 microns.

Accordingly it can be understood that the diminution of the wall-thickness of internal insulation is exclusively effective for the diminution of the diameter of shielded wire.

However, the diminution of the wall-thickness of the internal polyethylene foam insulation leads to some problems that the remarkable lowering of dielectric breakdown voltage, and the generation of defects such as pinholes by an outer mechanical shock.

For example, the DC breakdown voltage of the shielded wire with 200 microns diameter internal conductor and 300 microns thick low-density polyethylene foam (diameter of internal bubbles are less than the thickness of the wall) insulation is about 3.4 kV however, the DC breakdown voltage of the shielded wire with same 200 microns diameter internal conductor and 100 microns thick low-density polyethylene foam (diameter of internal bubbles are also controlled less than the thickness of the wall) insulation is only about 0.43 kV.

Problems to be Solved by the Invention

As described above, the polyethylene foam insulated shielded wires have been widely applied as the interconnecting wires and cables between computer equipments however, the shielded wire with less than 300 microns thick polyethylene foam insulator, which is suitable for assembling the small diameter shielded cables has never been known on account of its low dielectric breakdown voltage.

Thus, it is desired to develop the shielded wire with thin-wall polyethylene foam insulation without showing the problems such as lowering the dielectric breakdown voltage.

Construction of the Invention

The present inventor has found from his repeated earnest investigations on said problems that the wall-thickness of insulating polyethylene foam can be diminished without remarkable lowering of the dielectric breakdown voltage by means of the controlling the diameter of bubbles less than a half times of the wall-thickness of the insulating polyethylene foam layer, even though its wall-thickness is less than 100 microns, whereby achieving the present invention.

FIG. 1 shows a sectional construction of a shielded wire according to this present invention.

Referring to FIG. 1, the shielded wire according to this present invention is characterized by that an insulating layer 2 of an internal conductor 1 is polyethylene foam with a wall-thickness of said polyethylene foam layer being less than 100 microns, and a maximum diameter of bubbles within said polyethylene foam layer being less than a half times said wall-thickness of said polyethylene foam layer.

In addition, reference numeral 3 in FIG. 1 designates an external conductor and reference numeral 4 in FIG. 1 designates outer insulating sheath.

For example, an electric wire with 200 microns diameter and low-density polyethylene (density: 0.909 g/cm$^3$, melting point: 107° C.) foam insulating layer, of which maximum diameter of bubbles was controlled under 30 microns, had DC breakdown voltage of 2.0 kV as the result of DC breakdown voltage measurement at room temperature.

It was recognized that the dielectric breakdown voltage depends on the diameter of the bubbles existing in the polyethylene insulating layer, and also recognized the tendency that the dielectric breakdown voltage was improved with the diminution of the diameter of bubbles within the polyethylene insulating layer.

And in addition, the dielectric breakdown voltage wwas exclusively improved by means of controlling the maximum diameter of bubbles less than a half times of wall-thickness of polyethylene insulating layer.

Preferred Embodiments

The present invention will be below in details described with reference to the preferred embodiments thereof.

EXAMPLE 1

A tin coated copper single wire having outside diameter of 200 microns (a thickness of coated tin layer is about 1 micron) was used as an internal conductor, the low density polyethylene foam (density of virgin low-density polyethylene: 0.920 g/cm$^3$, melting point: 112° C., maximum diameter of bubbles: 30 microns) being coated 80 microns thick around said tine coated copper wire, the external conductor of tin coated copper wire having outside diameter 50 microns spiral wrapped around said low-density polyethylene foam, and further the sheath of low-density polyethylene (density: 0.923 g/cm$^3$, melting point 106° C.) having thickness of 100 microns being coated around said spiral wrapped external conductor to obtain a shielded wire.

The electric capacitance between the internal conductor and external conductor was 96 pF/m (1 kHz, 25° C.) on average as the result of capacitance measurement.

The DC breakdown voltage of this shielded wire was 2.2 kV on average as the result of measurement (plus electrode was connected with the internal conductor and negative one to the external conductor respectively).

EXAMPLE 2 to 7, COMPARATIVE EXAMPLE 1 to 7

Shielded wire of EXAMPLE 2 to 7, COMPARATIVE EXAMPLE 1 to 7 were prepared in same manner as described in EXAMPLE 1. Details of internal conductor, polyethylene foam insulator and external conductor are shown in Tables 1, 2.

In addition, the thickness of coated tin layer of each conductor is 1 micron.

The electric capacitance and dielectric breakdown voltage shown in Table 1, 2 were the value measured on 100 microns thick low-density polyethylene (density 0.923 g/cm$^3$, melting point 106° C.) sheath assembled samples in same manner as described in EXAMPLE 1.

TABLE 1

| | Construction of shielded electric wire | | | Characteristic | |
|---|---|---|---|---|---|
| EXAMPLE | Internal conductor | Foam polyethylene insulating layer | External conductor | Capacitance (pF/m, 25° C.) | DC breakdown voltage (kV) |
| 2 | Outside diameter 150μ Ta single wire | Low-density polyethylene Density (g/cm$^3$) = 0.916 mp (°C.) = 117° C. Wall-thickness (μ) = 100 Diameter of bubbles (μ) = 40 max | Outside diameter 50μ tin coated copper wire Spiral wrapped structure | 82 | 2.6 |
| 3 | Outside diameter 150μ Ta single wire | Low-density polyethylene Density (g/cm$^3$) = 0.923 mp (°C.) = 107° C. Wall-thickness (μ) = 100 Diameter of bubbles (μ) = 25 max | Outside diameter 50μ tin coated copper wire Spiral wrapped structure | 96 | 2.9 |
| 4 | Outside diameter 150μ Ta single wire | Low-density polyethylene Density (g/cm$^3$) = 0.923 mp (°C.) = 107° C. Wall-thickness (μ) = 100 Diameter of bubbles (μ) = 8 max | Outside diameter 50μ tin coated copper wire Spiral wrapped structure | 77 | 2.8 |
| 5 | Outside diameter 50μ Ta Seven-ply conductor | Low-density polyethylene Density (g/cm$^3$) = 0.918 mp (°C.) = 106° C. Wall-thickness (μ) = 70 Diameter of bubbles (μ) = 18 max | Outside diameter 30μ tin coated copper wire Spiral wrapped structure | 109 | 2.2 |
| 6 | Outside diameter 50μ Ta Seven-ply conductor | Low-density polyethylene Density (g/cm$^3$) = 0.918 mp (°C.) = 106° C. Wall-thickness (μ) = 50 Diameter of bubbles (μ) = 18 max | Outside diameter 30μ tin coated copper wire Spiral wrapped structure | 122 | 1.3 |
| 7 | Outside diameter 150μ Ta single wire | Low-density polyethylene Density (g/cm$^3$) = 0.909 mp (°C.) = 112° C. Wall-thickness (μ) = 70 Diameter of bubbles (μ) = 26 max | Outside diameter 30μ tin coated copper wire Spiral wrapped structure | 92 | 1.9 |

TABLE 2

| COMPARATIVE EXAMPLE | Construction of shielded electric wire: Internal conductor | Foam polyethylene insulating layer | External conductor | Characteristic: Capacitance (pF/m, 25° C.) | DC breakdown voltage (kV) |
|---|---|---|---|---|---|
| 1 | Outside diameter 200μ Ta single wire | Low-density polyethylene Density (g/cm³) = 0.920 mp (°C.) = 112° C. Wall-thickness (μ) = 80 Diameter of bubbles (μ) = 70 max | Outside diameter 50μ tin coated copper wire Spiral wrapped structure | 80 | 0.56 |
| 2 | Outside diameter 150μ Ta single wire | Low-density polyethylene Density (g/cm³) = 0.916 mp (°C.) = 117° C. Wall-thickness (μ) = 100 Diameter of bubbles (μ) = 85 max | Outside diameter 50μ tin coated copper wire Spiral wrapped structure | 79 | 0.43 |
| 3 | Outside diameter 150μ Ta single wire | Low-density polyethylene Density (g/cm³) = 0.923 mp (°C.) = 107° C. Wall-thickness (μ) = 100 Diameter of bubbles (μ) = 75 max | Outside diameter 50μ tin coated copper wire Spiral wrapped structure | 95 | 0.71 |
| 4 | Outside diameter 150μ Ta single wire | Low-density polyethylene Density (g/cm³) = 0.923 mp (°C.) = 107° C. Wall-thickness (μ) = 100 Diameter of bubbles (μ) = 60 max | Outside diameter 50μ tin coated copper wire Spiral wrapped structure | 77 | 1.3 |
| 5 | Outside diameter 50μ Ta Seven-ply conductor | Low-density polyethylene Density (g/cm³) = 0.918 mp (°C.) = 106° C. Wall-thickness (μ) = 70 Diameter of bubbles (μ) = 50 max | Outside diameter 30μ tin coated copper wire Spiral wrapped structure | 98 | 0.38 |
| 6 | Outside diameter 50μ Ta Seven-ply conductor | Low-density polyethylene Density (g/cm³) = 0.918 mp (°C.) = 106° C. Wall-thickness (μ) = 50 Diameter of bubbles (μ) = 35 max | Outside diameter 30μ tin coated copper wire Spiral wrapped structure | 101 | 0.32 |
| 7 | Outside diameter 150μ Ta single wire | Low-density polyethylene Density (g/cm³) = 0.909 mp (°C.) = 112° C. Wall-thickness (μ) = 70 Diameter of bubbles (μ) = 48 max | Outside diameter 30μ tin coated copper wire Spiral wrapped structure | 96 | 0.46 |

Effects of the Invention

As described above, according to the present invention, a very small diameter shielded wire having low electric capacitance and high dielectric breakdown voltage can be obtained and it is remarkably useful as interconnecting wires and cables for computer equipments, video equipments.

I claim:

1. In a shielded wire consisting essentially of an internal conductor, an insulating layer surrounding said internal conductor, an external conductor surrounding said insulating layer and said interanl conductor and an outer insulating sheath surrounding the external conductor, the improvement wherein the insulating layer of said internal conductor is polyethylene foam with the wall-thickness of said polyethylene foam layer being less than 100 microns, and wherein the maximum diameter of the bubbles within said polyethylene foam layer are less than one half times the wall-thickness of the polyethylene foam layer.

* * * * *